June 12, 1928.　　　　　R. L. HAWKINS　　　　　1,673,046
CLUTCH CONSTRUCTION
Filed Feb. 7, 1927
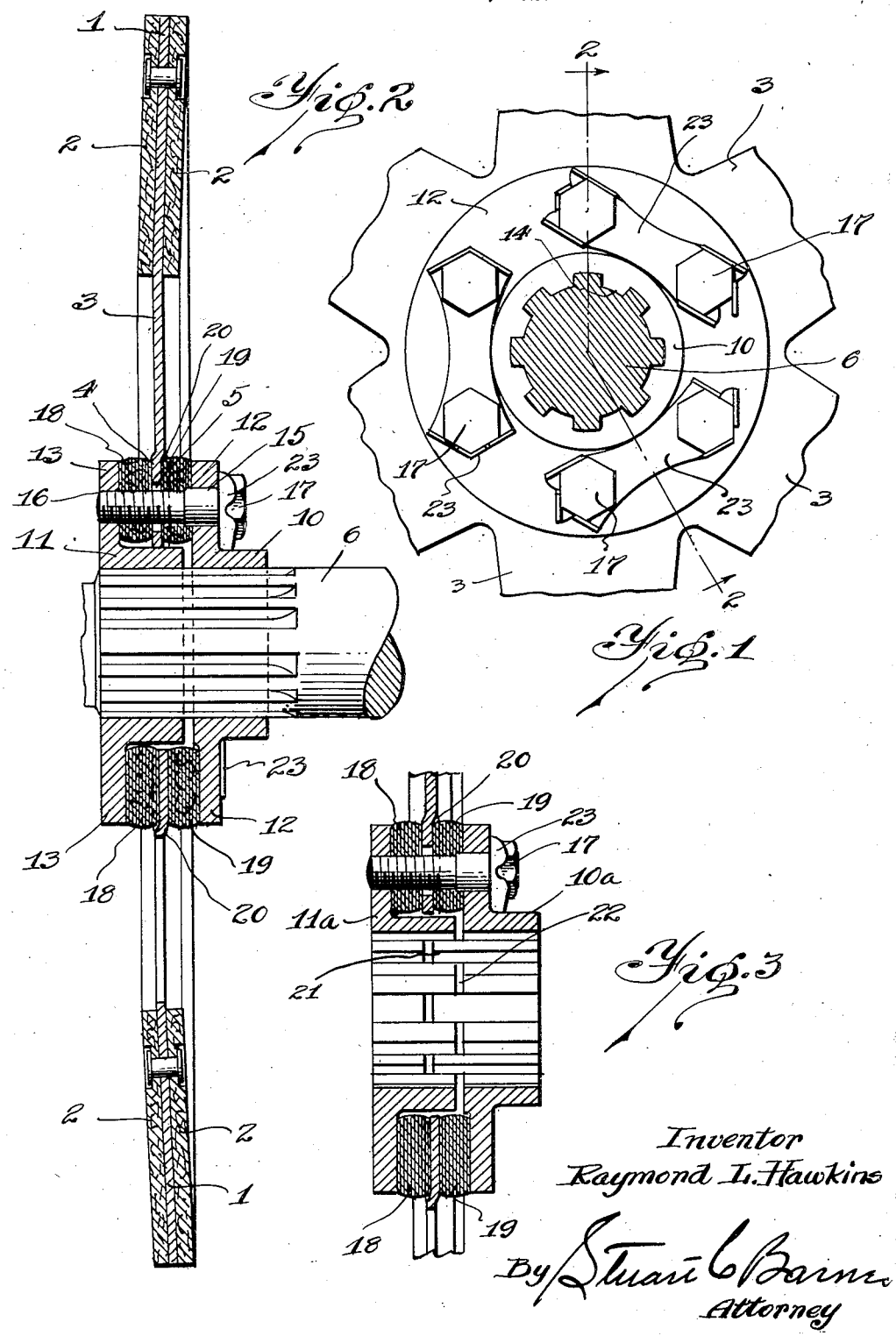

Patented June 12, 1928.

1,673,046

UNITED STATES PATENT OFFICE.

RAYMOND L. HAWKINS, OF DETROIT, MICHIGAN, ASSIGNOR TO LONG MANUFACTURING COMPANY, OF DETROIT, MICHIGAN, A CORPORATION OF MICHIGAN.

CLUTCH CONSTRUCTION.

Application filed February 7, 1927. Serial No. 166,425.

This invention relates to clutches of the type designed to afford a driving connection of a yieldable nature to dampen vibrations and to ease the shock when sudden changes are made in the load.

The invention is concerned more particularly with a clutch construction which includes two members, one of which drives the other, and which are secured together with a yieldable element in such a way that there is a limited movement between the two members which is resisted by distortion of the yieldable element. In my copending application Serial No. 73,460 clutch constructions of this character are described and claimed.

An advantageous form of this type of construction consists of a disk member having a separate hub, and the hub has a flange which faces or laps the disk. The flange and the disk are bolted or otherwise secured together with a flexible element so that there is a limited movement between the disk and flange resisted by the yieldable element. One of these members drives the other through the connection, and inasmuch as the flange of the hub and a portion of the disk are positioned side by side, or face to face, there is a twisting action between the two. This twisting action is especially noticeable where the yieldable element is disposed between the disk and the flange so that the disk and flange are spaced from each other. It is undesirable to have this twisting action, and among the reasons may be mentioned the disalignment of the parts, and also that the twisting is inductive to abnormal strains and wear upon the connections.

Accordingly, the present invention aims to provide a construction wherein bolts, or other connecting means, are held by one of the members in such a way that there can be no twisting action of the bolts when the one member drives the other. For this purpose one of the members is constructed so as to engage the connecting means at spaced points so that they are held rigid when power is communicated from one member to the other through the connecting means.

In the accompanying drawings Fig. 1 is a plan view of the central portion of the clutch construction showing the hub and a portion of the disk including the spokes thereof.

Fig. 2 is a section through the entire disk and hub construction the central portion thereof being taken substantially on line 2—2 of Fig. 1.

Fig. 3 is a sectional view taken through the central portion of a modified form.

Referring to the drawings, a driven member of a clutch is shown, and it consists of a disk 1 having facings 2 for frictional engagement with a clutch driving member (not shown). The disk member 1 has spokes 3 and a central portion 4 provided with holes 5.

A hub for the disk consists of two members 10 and 11, each of which is provided with a flange 12 and 13. Both of the members are grooved, as shown at 14, so that both may be splined to a shaft 6.

The flange 12 is provided with a plurality of openings 15, and the flange 13 is provided with a corresponding number of openings 16 which are internally threaded, and bolts 17 are taken through the openings and also through the openings 5 of the disk member to secure the parts together. Disposed between the central part of the disk member and each of the flanges are yieldable elements 18 and 19. The bolts extend through holes in these members and when the bolts are tightened the yieldable members are squeezed between the flanges and the central portion of the disk.

It will be noted that the holes 5 in the disk are somewhat larger than the bolts so that normally there is a limited movement as between the disk and the hub members. However, when the parts are clamped together this limited movement is resisted by the distortion, or service distortion, of the yieldable members. The central portion of the disk is in tight frictional engagement with the faces of the yieldable elements, and preferably the central portion of the disk is deformed or roughened, as shown at 20, so that slippage of the disk relative to the yieldable members is resisted.

It will be noted that as the disk 1 drives its hub, or vice versa, which is made up of the two members 10 and 11, the bolts 17 are held in true perpendicular position relative to the disc because the parts 10 and 11 are splined onto the shaft and are fixed relative to each other and because these members support the bolts at spaced points. Preferably the disk lies between the flanges of the hub members.

In the modified form shown in Fig. 3, the two parts of the hub are provided with alternate projections and recesses 21 and 22. The two hub parts are positioned together with the projections and recesses interfitting, and thus the two parts are held secure relative to each other in addition to being splined onto the shaft. With such a construction only one member need be splined to the shaft.

Spring-like retaining or locking devices 23 may be used which cooperate with the heads of the bolts to prevent their turning and consequent loosening when the device is in use.

In some of the claims appended hereto, the two hub members are described as being fixed with relation to each other, and this language is intended to cover the form where the two members are interlocked together, and also the form where the two members are not locked together but merely splined onto the shaft.

What I claim is:

1. In a clutch, a disk, a hub for the disk adapted to be connected therewith in driving relation, said hub consisting of two parts fixed with relation to each other, a flange on each part and rigid clamping means extending through both flanges and the disk, said means being held perpendicularly with respect to the disk by the flanges on the hub member and a yieldable element disposed between the disk and at least one of the flanges.

2. In a clutch, a disk member, a hub for the disk consisting of two members fixed with relation to each other and each affording a flange, bolts passing through the flanges and the disk for connecting the hub and disk together in driving relation, a yieldable element disposed between the disk and at least one of the flanges, said bolts being held perpendicular with respect to the disk by reason of the fixed relation of the hub parts.

3. In a clutch, a disk member, a hub for the disk consisting of two parts, a shaft, each hub part being splined to the shaft, a flange on each hub part, said flanges being disposed on opposite sides of the disk, a yieldable element between the disk and at least one of the flanges, bolts for clamping the flanges, disk and yieldable elements together, said bolts being held perpendicularly with respect to the disk by the two flanges.

4. In a clutch, a disk member, a hub for the disk, said hub consisting of two parts each having a flange, means for holding the hub parts fixed with relation to each other, yieldable elements associated with the disk and flanges, means passing through the flanges for securing the disk, the hub parts and yieldable elements together in such a way as to permit limited movement between the disk and hub parts, said means being held perpendicularly with respect to the disk by reason of the fixed relation of the hub parts.

5. In a clutch, a disk member, a hub for the disk, said hub consisting of two parts each affording a flange, yieldable elements associated with the disk and flanges, means passing through the flanges and securing the disk and the hub parts and the yieldable elements together so that the disk and hub are in driving relation, said means being held perpendicularly with respect to the disk by reason of the fixed relation of the hub parts.

6. In a clutch, a disk member, a hub for the disk, said hub consisting of two parts, each affording a flange, said two parts being in fixed position with relation to each other, yieldable elements disposed between the disk and each flange, bolts passing through the flanges, yieldable elements and disk for clamping them together in driving relation, the disk being associated with the bolts so as to have a limited movement relative thereto which is resisted by the yieldable elements, the said bolts being held perpendicularly with respect to the disk by reason of their connection with the two flanges of the hub parts.

In testimony whereof I affix my signature.

RAYMOND L. HAWKINS.